(12) United States Patent
Parkin

(10) Patent No.: US 10,953,991 B2
(45) Date of Patent: Mar. 23, 2021

(54) AIRCRAFT ALTITUDE WARNING AND OXYGEN PRESENTATION

(71) Applicant: THE BOEING COMPANY, Chicago, IL (US)

(72) Inventor: Patrick D. Parkin, Bonney Lake, WA (US)

(73) Assignee: THE BOEING COMPANY, Chicago, IL (US)

(*) Notice: Subject to any disclaimer, the term of this patent is extended or adjusted under 35 U.S.C. 154(b) by 770 days.

(21) Appl. No.: 15/725,609

(22) Filed: Oct. 5, 2017

(65) Prior Publication Data
US 2019/0106218 A1 Apr. 11, 2019

(51) Int. Cl.
*B64D 13/04* (2006.01)

(52) U.S. Cl.
CPC ........ *B64D 13/04* (2013.01); *B64D 2231/025* (2013.01)

(58) Field of Classification Search
None
See application file for complete search history.

(56) References Cited

U.S. PATENT DOCUMENTS

| | | | |
|---|---|---|---|
| 6,452,510 B1* | 9/2002 | Zysko | B64D 25/00 340/970 |
| 6,737,988 B2 | 5/2004 | Horner et al. | |
| 10,202,204 B1* | 2/2019 | Daidzic | B64D 45/08 |
| 10,321,221 B1* | 6/2019 | Quezada | H04R 1/1083 |
| 2003/0157875 A1* | 8/2003 | Horner | B64D 13/04 454/74 |
| 2004/0102150 A1* | 5/2004 | Horner | B64D 13/04 454/74 |
| 2006/0019594 A1 | 1/2006 | Horner et al. | |
| 2006/0025064 A1 | 2/2006 | Horner et al. | |
| 2010/0267375 A1* | 10/2010 | Lemmon | H04M 1/72577 455/418 |
| 2010/0308992 A1* | 12/2010 | Al-Rehaili | G01S 19/17 340/539.13 |
| 2011/0046822 A1* | 2/2011 | Gray | B64D 13/04 701/3 |
| 2011/0166723 A1* | 7/2011 | Valentova | G08G 5/02 701/16 |
| 2014/0323026 A1* | 10/2014 | Lewis | B64D 13/04 454/74 |
| 2017/0166323 A1* | 6/2017 | Dangler | B64C 25/30 |
| 2017/0325727 A1* | 11/2017 | Buza | A61B 5/0022 |
| 2018/0075757 A1* | 3/2018 | Estes | G08G 5/025 |
| 2018/0338003 A1* | 11/2018 | Carlson | H04W 4/38 |
| 2018/0350227 A1* | 12/2018 | Komoni | H04W 4/80 |

* cited by examiner

*Primary Examiner* — Fekadeselassie Girma
(74) *Attorney, Agent, or Firm* — Moore IP Law

(57) ABSTRACT

An aircraft includes a fuselage having a cabin. The aircraft also includes a cabin pressure sensor configured to detect cabin pressure level of the cabin. The aircraft further includes a controller configured to determine a pressure threshold as a function of a pressure altitude of a destination airport of the aircraft. The controller is also configured to activate a flight safety system based on the cabin pressure level satisfying the pressure threshold.

20 Claims, 7 Drawing Sheets

AIRCRAFT ALTITUDE WARNING AND OXYGEN PRESENTATION

FIELD OF THE DISCLOSURE

The present disclosure is generally related to altitude warning and oxygen presentation related to aircraft cabin pressure.

BACKGROUND

Atmospheric pressure is related to the weight of an air column above a pressure measurement location. Ignoring other considerations, as altitude increases, atmospheric pressure decreases. This decrease in atmospheric pressure results in a corresponding decrease in the partial pressure of oxygen. That is, although the percentage of oxygen in the atmosphere at a higher elevation may be the same as the percentage of oxygen in the atmosphere in at a lower elevation, since there is less air mass per unit volume at the higher elevation, there is less oxygen in a unit of volume at the higher elevation.

Above particular elevations, the partial pressure of oxygen available in the atmosphere can be too low for safe and healthy human functioning. Many commercial aircraft regularly operate at elevations above 30,000 feet, which is well above the elevation at which hypoxia becomes a concern. Such aircraft include a pressurized cabin area to maintain passenger safety and comfort. While on the ground with the doors open, the aircraft cabin pressure is equalized with the ambient conditions at the departure airport. After takeoff, the cabin pressure is controlled to maintain a pressure altitude, or a pressure level corresponding to a given altitude, that is comfortable for the passengers (e.g., a pressure corresponding to an altitude that is less than about 8,000 feet). During landing, the cabin pressure is gradually changed to equalize the cabin pressure with the ambient pressure at the destination airport.

Such aircraft also include backup safety features, such as oxygen masks that deploy to each passenger seat if the pressure altitude in the cabin is too high. For example, a typical aircraft may be configured to deploy oxygen masks to passengers if the pressure altitude in the cabin is greater than about 14,700 feet, since a pressure altitude greater than 14,700 feet represents a relatively lower pressure level compared to the pressure levels at altitudes less than about 8,000 feet.

While a pressure altitude of 14,700 feet is considered a safe oxygen deployment threshold, it is not suitable in some circumstances. For example, some airports are situated at elevations greater than 14,700 feet above mean sea level. An oxygen deployment threshold of 14,700 feet cannot be used for aircraft landing at such high-elevation airports.

SUMMARY

In a particular implementation, an aircraft includes a fuselage having a cabin. The aircraft also includes a cabin pressure sensor configured to detect cabin pressure of the cabin. The aircraft further includes a controller configured to determine a pressure threshold as a function of a pressure altitude of a destination airport of the aircraft. The controller is also configured to activate a flight safety system based on the cabin pressure satisfying the pressure threshold.

In another particular implementation, a method includes determining a pressure threshold as a function of a pressure altitude of a destination airport of an aircraft. The method also includes determining a cabin pressure of a cabin of the aircraft and determining whether to activate a flight safety system of the aircraft based on comparing the cabin pressure to the pressure threshold.

In another particular implementation, a line replaceable unit includes a processor and a memory storing instructions. The instructions are executable by the processor to perform operations including determining a pressure threshold as a function of a pressure altitude of a destination airport of an aircraft. The operations also include determining whether to activate a flight safety system based on a comparison of a cabin pressure and the pressure threshold.

The features, functions, and advantages described herein can be achieved independently in various implementations or may be combined in yet other implementations, further details of which can be found with reference to the following description and drawings.

DETAILED DESCRIPTION

Figure 1:
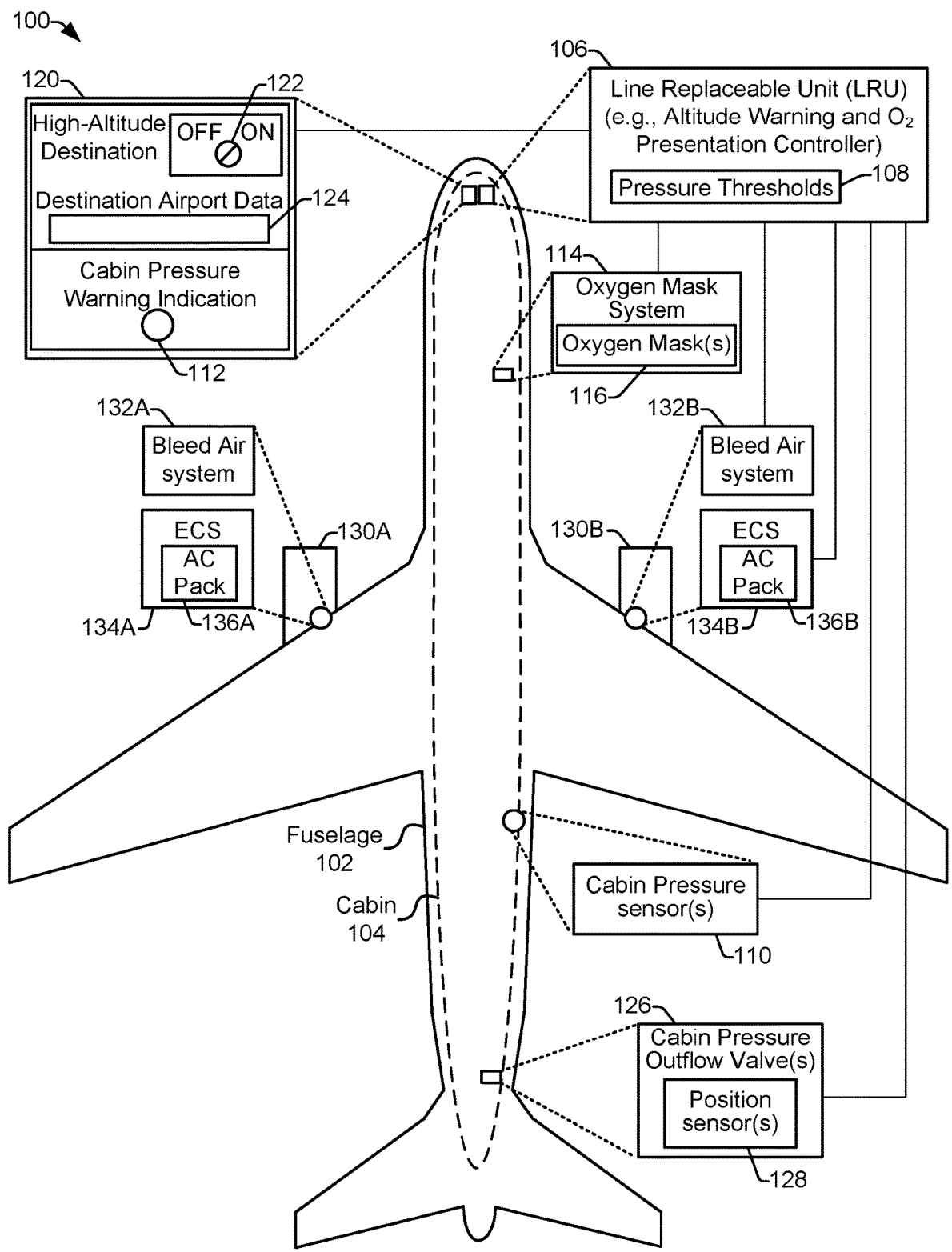
FIG. 1 is a diagram illustrating an aircraft including a line replaceable unit (LRU) configured to provide altitude warning and oxygen presentation functions.

In a particular implementation disclosed herein, an aircraft includes a controller (e.g., a line replaceable unit) that is configured to determine a cabin pressure threshold based on the pressure altitude of a destination airport of the aircraft. The pressure altitude of the destination airport indicates an effective altitude (e.g., an effective height above mean sea level) of the destination airport based on the physical altitude of the destination airport (e.g., actual height above mean sea level) and current meteorological conditions at the destination airport (e.g., weather or climate related pressure variations). For example, in some regions ground level heating during summer months can lead to (or be associated with) lower atmospheric pressure conditions. Pressure in the atmosphere is inversely related to altitude, thus lower atmospheric pressure corresponds to high pressure altitude. Accordingly, in a region where summer months have lower atmospheric pressure on average than winter months, the pressure altitude may be higher (on average) in the summer months than in the winter months. While atmospheric pressure can vary seasonally, other conditions can also affect both the atmospheric pressure and pressure altitude. For example, certain weather patterns are associated with significant variations in atmospheric pressure. The pressure altitude of the destination airport indicates, for example, for a particular day or for a particular time of day, the current pressure altitude of the destination airport.

The controller is configured to determine a cabin pressure warning threshold, an oxygen-mask deployment threshold, or both, based on the pressure altitude of the destination airport. The cabin pressure warning threshold (also referred to herein as an "warning threshold") is a cabin pressure altitude above which the aircraft crew is notified of a possible concern. For example, if cabin pressure sensors in the aircraft cabin indicate that the cabin pressure altitude is at or above the cabin pressure warning threshold, a cabin pressure warning indication (such as a warning light or an audible alarm) is activated to notify the aircraft crew. The oxygen-mask deployment threshold (also referred to herein as an "oxygen deployment threshold") is a cabin pressure altitude above which oxygen masks are automatically deployed within the cabin. For example, if cabin pressure sensors in the aircraft cabin indicate that the cabin pressure altitude (or sensed pressure level) is at or above the oxygen-mask deployment threshold, an oxygen mask system deploys oxygen masks to passengers and crew members.

When a cabin pressure system of the aircraft is operating in a default or normal mode (as opposed to a high-altitude destination mode), the warning threshold and the oxygen deployment threshold are set to default values. For example, the warning threshold may be set to a default pressure altitude value of about 10,000 feet, and the oxygen-mask deployment threshold may be set to a default pressure altitude value of 14,700 feet. However, in particular embodiments, when the cabin pressure system of the aircraft is operating in a high-altitude destination mode, the controller may determine a pressure threshold (as used herein, a "pressure threshold" is a generic term that refers to either or both of the cabin pressure warning threshold and the oxygen-mask deployment threshold) as a function of the pressure altitude of the destination airport. As a simple example, the functional relationship between the pressure threshold and the pressure altitude of the destination airport may be linear. To illustrate, the pressure threshold may increase linearly as the pressure altitude of the destination airport increases. In other examples, more complex functions, such as non-linear functions, may be used.

Further, in some examples, other information may be used with the pressure altitude of the destination airport to determine the pressure threshold. For example, the other information can include information about the operation or state of a particular component or system of the aircraft. In another example, the other information can include information indicating a phase of flight of the aircraft.

Some aircraft that operate at high-altitude airports may include a system that enables selection of a high-altitude destination mode to change the default pressure thresholds to higher default values. That is, in a normal mode, the system uses first default pressure threshold values, and in the high-altitude destination mode, the system uses second default pressure threshold values, where the first values are less than the second values. Since both the normal mode and the high-altitude destination mode use default values, such systems are referred to herein as switchable systems. A pilot can switch between using a first set of default values (in the normal mode) and a second set of default values (in the high-altitude destination mode). As described further with reference to FIG. 3, while operating in the high-altitude destination mode, such switchable system can decrease the amount of time that aircraft crew have to respond to a warning before oxygen masks are deployed.

In contrast, systems disclosed herein use default pressure threshold values in a normal mode, and in the high-altitude destination mode, determine the pressure threshold values as a function of the pressure altitude of the destination airport. Accordingly, to contrast with the switchable systems, the systems disclosed herein may be referred to as dynamic systems. The function (or functions) used by such dynamic systems to determine the pressure thresholds can be selected to avoid or mitigate issues that arise from use of default pressure threshold values. For example, as described further with reference to FIG. 3, the function can be selected such that the cabin pressure warning threshold and the oxygen-mask deployment threshold vary together, so that a distance between these thresholds is maintained sufficiently for the aircraft crew to have some time to respond between activation of the cabin pressure warning indication and deployment of oxygen masks.

Figure 2:
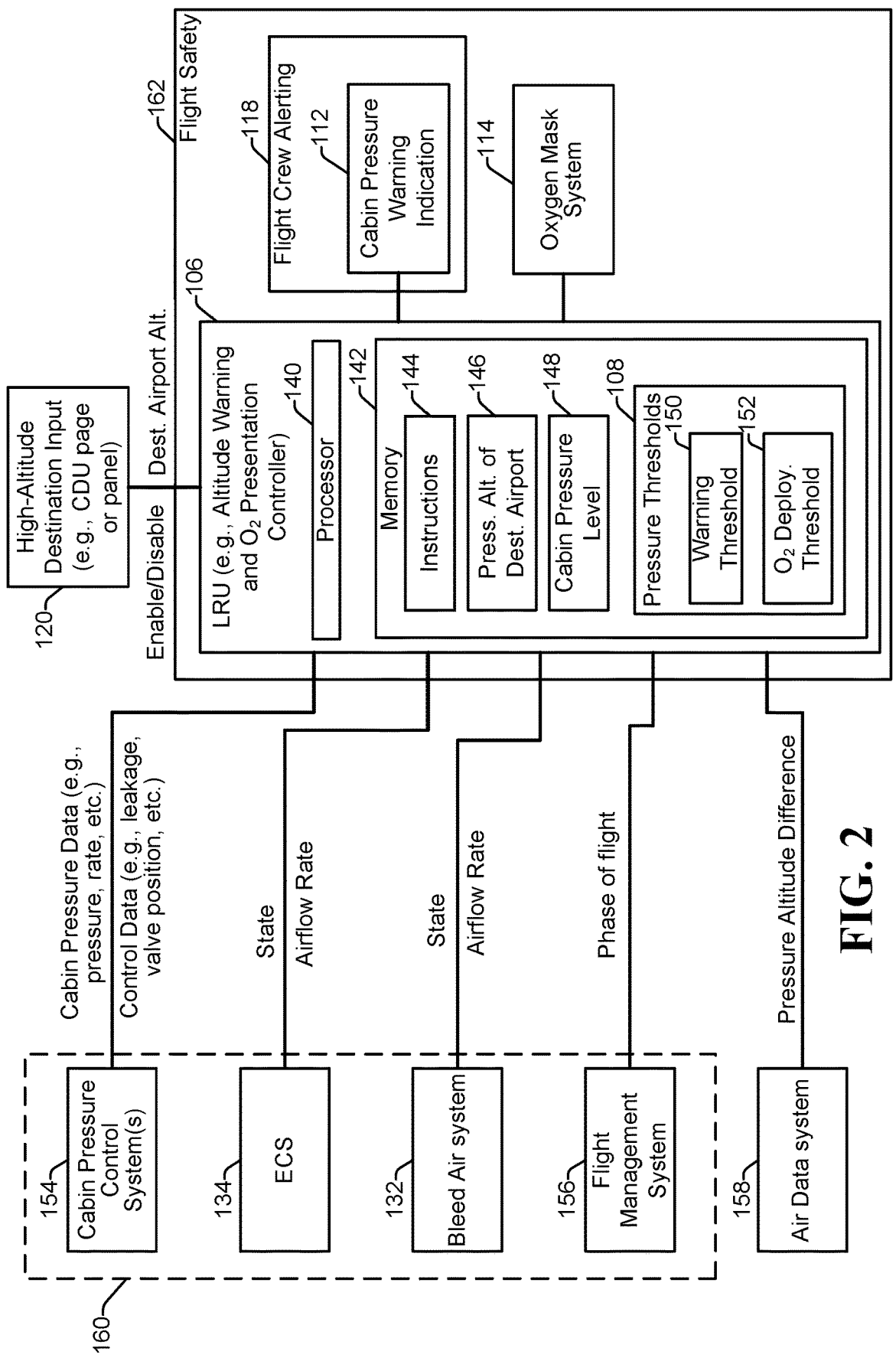
FIG. 2 is a diagram illustrating the LRU of FIG. 1 and associated components and systems of the aircraft of FIG. 1.

FIG. 1 is a diagram illustrating an aircraft 100 including a line replaceable unit (LRU) 106 configured to provide altitude warning and oxygen presentation functions. The LRU 106 includes or corresponds to an altitude warning and oxygen ("O$_2$") presentation controller. FIG. 2 is a diagram illustrating the LRU 106 and associated components and systems of the aircraft 100. In particular, FIG. 1 provides an overview of the aircraft 100 and its components, and FIG. 2 provides more detail related to the LRU 106 and flight safety systems of the aircraft 100. FIGS. 1 and 2 are described together below.

The aircraft 100 includes a fuselage 102, at least a portion of which is environmentally controlled and is referred to as a cabin 104. A representative cabin pressure sensor 110 is positioned in the cabin 104 and is configured to detect cabin pressure level 148 of the cabin 104. Although only one cabin pressure sensor 110 is shown, the aircraft 100 may include more than one cabin pressure sensor 110, and the cabin pressure level 148 may indicate an aggregate (e.g., average) cabin pressure value or agreed (e.g., voted or predicted more reliable) cabin pressure value.

Environmental conditions, such as temperature and pressure, are controlled within the cabin 104 using an environmental control system (ECS) 134. In the example illustrated in FIG. 1, an environmental control systems 134A is coupled to an engine 130A via a bleed air system 132A, and an environmental control systems 134B is coupled to an engine 130B via a bleed air system 132B. The bleed air system 132A is configured to provide bleed air extracted from airflow within the engine 130A to the environmental control system 134A. An air conditioning (AC) pack 136A of the environmental control system 134A cools the bleed air and the environmental control system 134A routes the cooled air to vents in the cabin 104 to provide cabin pressurization and cooling. Similarly, the bleed air system 132B is configured to provide bleed air extracted from airflow within the engine 130B to the environmental control system 134B. An air conditioning pack 136B of the environmental control system 134B cools the bleed air and the environmental control system 134B routes the cooled air to vents in the cabin 104 to provide cabin pressurization and cooling.

Although the example illustrated in FIG. 1 includes two environmental control systems 134A and 134B and associated components (e.g., two engines 130A and 130B, and two bleed air systems 132A and 132B), in other implementations, the aircraft 100 includes more environmental control system or fewer environmental control system. For example, if the aircraft 100 includes three engines, the aircraft 100 may include three environmental control systems. Further, although FIG. 1 illustrates a one-to-one relationship among engines, environmental control systems, and bleed air systems, in other embodiments, the aircraft 100 includes a different number of engines than bleed air systems, a different number of engines than environmental control systems, a different number of bleed air systems than environmental control systems, or a combination thereof. To illustrate, in some implementations, the aircraft 100 includes three engines, three bleed air systems (one per engine), and two environmental control systems, such that one bleed air system is a back-up that can supply air to either of the two environmental control systems. Additionally, the environmental control systems 134A and 134B may be configured to operate concurrently, or one of the environmental control systems 134A and 134B may be a primary environmental control system, and the other may be a backup or alternate environmental control system. Further, although two environmental control systems 134A and 134B are shown in FIG. 1, the aircraft 100 may include more than two environmental control system systems or fewer than two environmental control systems. Thus, the specific examples illustrated in FIGS. 1 and 2 are not the only examples envisioned.

Cabin pressure within the cabin 104 is controlled using the environmental control system 134 (i.e., either or both of the environmental control systems 134A and 134B) and a cabin pressure outflow valve 126. The environmental control system 134 forces air into the cabin 104, and the cabin pressure outflow valve 126 allows air to vent from the cabin 104. At least a portion of the air flow into the cabin 104 from the environmental control system 134 may be controlled by individual passengers. For example, a passenger can open or close a vent near the passenger's seat to adjust air flow. Thus, the position of the cabin pressure outflow valve 126 (as indicated by a position sensor 128 of the cabin pressure outflow valve 126) may be used as a primary cabin pressure control. While FIG. 1 illustrates a single cabin pressure outflow valve 126 and a single position sensor 128 to indicate a position of the cabin pressure outflow valve 126, in other implementations, the aircraft 100 includes more than one cabin pressure outflow valve, more than one position sensor associated with each cabin pressure outflow valve, or both.

As indicated above, the LRU 106 corresponds to or includes an altitude warning and oxygen presentation controller. The LRU 106 is configured to compare the cabin pressure level 148 to pressure thresholds 108 and to perform various operations, such as activating a flight safety system 162, based on the comparison. For example, as illustrated in FIG. 2, the flight safety system 162 includes a flight crew alerting system 118 (including a cabin pressure warning indication 112), and the pressure thresholds 108 include a warning threshold 150. In this example, the LRU 106 is configured to activate the cabin pressure warning indication 112 if the comparison indicates that the cabin pressure level 148 satisfies the warning threshold 150. As used herein, the cabin pressure level 148 and the pressure thresholds 108 are expressed in terms of pressure altitude (e.g., a number of feet above mean sea level corresponding to the measured pressure). Thus, the cabin pressure level 148 satisfies the warning threshold 150 when the pressure altitude within the cabin 104 is greater than or equal to the pressure altitude indicated by the warning threshold 150. For example, when a low cabin pressure level is sensed that is equivalent to a pressure level at 16,000 feet, this corresponds to a pressure altitude of 16,000 feet that would be greater than a pressure altitude indicated by the warning threshold of 14,700 feet, at which altitude the pressure level is relatively higher than the pressure at 16,000 feet.

In another example, as illustrated in FIG. 2, the flight safety system 162 includes an oxygen mask system 114, and the pressure thresholds 108 include an oxygen deployment ("02 deploy.") threshold 152. In this example, the LRU 106 activates the oxygen mask system 114 if the comparison indicates that the cabin pressure level 148 satisfies the oxygen deployment threshold 152. Activating the oxygen mask system 114 causes oxygen masks 116 to be deployed in the cabin 104. When the oxygen deployment threshold 152 is expressed in terms of pressure altitude, the cabin pressure level 148 satisfies the oxygen deployment threshold 152 when the pressure altitude within the cabin 104 is greater than or equal to the pressure altitude indicated by the oxygen deployment threshold 152.

In the example illustrated in FIGS. 1 and 2, an operational mode of the LRU 106 is selectable based on a high-altitude destination input 120. For example, the high-altitude destination input 120 may include or correspond to a selectable element displayed via a control display unit (CDU), a physical switch, a soft switch, or another input device. The high-altitude destination input 120 is selectable to indication operation in a high-altitude destination mode. For example, in FIG. 1, the high-altitude destination input 120 includes a switchable element 122 with two positions including a first position (e.g., "ON") to indication operation in a high-altitude destination mode, and a second position (e.g., "OFF") to indication operation in a non-high-altitude destination mode (e.g., in a default or normal mode).

When the aircraft 100 is destned for a typical airport (e.g., an airport with a pressure altitude less than about 8,500 feet), the pilot may leave the high-altitude destination input 120 in the non-high-altitude destination mode. When the high-altitude destination input 120 is in the non-high-altitude destination mode, the LRU 106 uses default values for the pressure thresholds 108. For example, the default value of the warning threshold 150 may be about 10,000 feet and the default value of the oxygen deployment threshold 152 may be between 14,000 feet and 15,000 feet, e.g., about 14,700 feet. The default values are independent of the pressure altitude of the destination airport. For example, using the values above, in the non-high-altitude destination mode, a warning threshold value of 10,000 feet may be used for a first airport with a pressure altitude below mean sea level (such as Bar Yehuda Airfield in Israel with a physical altitude of about 1,240 feet below mean sea level) and may be used for a second airport with a pressure altitude just under a high-altitude destination limit (such as Mariscal Lamar International Airport in Ecuador with a physical altitude of about 8,300 feet).

When the aircraft 100 is destned for a high altitude airport (e.g., an airport with a pressure altitude greater than or equal to about 8,500 feet), the pilot may use the high-altitude destination input 120 to select the high-altitude destination mode. While operating in the high-altitude destination mode, the LRU 106 determines one or more of the pressure thresholds 108 based on the pressure altitude of the destination airport 146. Data indicating the pressure altitude of the destination airport 146 can be provided by the pilot (e.g., via data field 124 of a control display unit (CDU) or another input device) or the data indicating the pressure altitude of the destination airport can be received automatically via a communications data link between the aircraft 100 and a ground-based source (not shown). In some implementations, the LRU 106 is configured to determine the pressure altitude of the destination airport 146 based on a physical altitude of the destination airport and a pressure altitude difference value associated with the destination airport. The pressure altitude difference value indicates a difference between the physical altitude of the destination airport and the pressure altitude of the destination airport 146.

In a particular implementation, the LRU 106 determines the pressure thresholds 108 using a look-up table (e.g., in a memory 142 of the LRU 106). To illustrate, in this implementation, the look-up table includes a value of the pressure altitude of the destination airport 146 and corresponding values of the warning threshold 150 and the oxygen deployment threshold 152. In another implementation, a processor 140 of the LRU 106 calculates (e.g., by executing instructions 144 stored in the memory 142) one or more of the pressure thresholds 108 based on the pressure altitude of the destination airport 146. For example, the processor 140 may calculate the warning threshold 150 by interpolating a value between the default value of the warning threshold 150 and a maximum allowed value of the warning threshold, where the interpolation is based on a maximum pressure altitude at which the default value of the pressure altitude is used and a maximum destination airport value. An example of a linear interpolation is described with reference to FIG. 3; however, in other implementation, a piece-wise linear, or a non-linear interpolation is used.

Whether a look-up table, a calculation, or another process is used to determine the pressure thresholds 108 in the high-altitude destination mode, the LRU 106 can also use other information to determine the pressure thresholds 108. For example, an illustrative set 160 of components or subsystems of the aircraft 100 are shown in FIG. 2. One or more of the set 160 of components or subsystems of FIG. 2 may generate data that the LRU 106 uses to determine the pressure thresholds 108. In FIG. 2, the set 160 of components or subsystems includes a cabin pressure control system 154, the environmental control system 134, the bleed air system 132, and a flight management system 156. In other implementations, the set 160 of components or subsystems that provides data to the LRU 106 to determine the pressure thresholds 108 includes more, fewer, or different components or subsystems.

In a particular implementation in which the LRU 106 uses a look-up table to determine the pressure thresholds 108, the LRU 106 may select the look-up table from a set of available look-up tables based on data from one of the set 160. To illustrate, the LRU 106 can select a particular look-up table based on a state of the environmental control system 134, based on an airflow rate of the environmental control system 134, based on a state of the bleed air system 132, based on an airflow rate of the bleed air system 132, based on a phase of flight indicated by a flight management system 156, based on cabin pressure data or control data from a cabin pressure control system 154, or based on a combination thereof.

In another particular implementation, the LRU 106 uses a specific function or specific parameters based on data from one of the set 160. To illustrate, the LRU 106 can select a particular function used to determine one of the pressure thresholds 108 or can set a particular parameter of a function used to determine one of the pressure thresholds 108 based on a state of the environmental control system 134, based on an airflow rate of the environmental control system 134, based on a state of the bleed air system 132, based on an airflow rate of the bleed air system 132, based on a phase of flight indicated by a flight management system 156, based on cabin pressure data or control data from a cabin pressure control system 154, or based on a combination thereof.

As a specific example, in some implementations, the bleed air system 132 is configured to send data indicating a state of the bleed air system 132. In this example, the state of the bleed air system 132 indicates whether a component of the bleed air system 132 is operating normally, is operating abnormally (e.g., with reduced functionality), or is not operating. Additionally or in the alternative, in some implementations, the bleed air system 132 is configured to send data indicating an airflow rate associated with the bleed air system 132. The airflow rate, the state, or both, are related to capacity of the cabin pressure control system 154 to control the cabin pressure level 148. For example, when the cabin pressure level 148 is low (i.e., the pressure altitude in the cabin 104 is high), the cabin pressure control system 154 can send control signals to the bleed air system 132 to increase the airflow rate through the bleed air system 132. However, if a portion of the bleed air system 132 is non-functional, or if the airflow rate is lower than expected (e.g., below a threshold or below a set point), this can be an indication that the bleed air system 132 is not able to provide enough airflow to maintain the cabin pressure level 148. Accordingly, the LRU 106 may determine the pressure thresholds 108 in a manner that results in a lower warning threshold 150 value than would be determined if the bleed air system 132 were functioning normally and had expected airflow. The lower warning threshold 150 value may provide the flight crew with more warning (and a corresponding longer time to respond) before a change in the cabin pressure level 148 causes deployment of the oxygen masks 116.

As another specific example, in some implementations, the environmental control system 134 is configured to send data indicating a state of the environmental control system 134. In this example, the state of the environmental control system 134 indicates whether a component of the environmental control system 134 is operating normally, is operating abnormally (e.g., with reduced functionality), or is not operating. For example, the state of the environmental control system 134 may indicate whether one of the AC packs 136A and 136B is non-operative. Additionally or in the alternative, in some implementations, the environmental control system 134 is configured to send data indicating an airflow rate associated with the environmental control system 134. Similar to the state and airflow rate of the bleed air system 132, the state, the airflow rate, or both, of the environmental control system 134 are related to capacity of the cabin pressure control system 154 to control the cabin pressure level 148. The state, the airflow rate, or both, of the environmental control system 134 may be used instead of the state, the airflow rate, or both, of the bleed air system 132. Alternatively, the LRU 106 may use the state, the airflow rate, or both, of the environmental control system 134 and the state, the airflow rate, or both, of the bleed air system 132 to determine the pressure thresholds 108.

As another specific example, in some implementations, the cabin pressure control system 154 is configured to provide data indicating a cabin pressure rate to the LRU 106. The cabin pressure rate refers to a rate of change of the cabin pressure (typically expressed terms of sea level feet per minute, where the change in pressure corresponds to the change in feet). In this example, LRU 106 is configured to determine a lower value of at least one of the pressure thresholds 108 responsive to a higher value of the cabin pressure rate and to determine a higher value of the pressure threshold responsive to a lower value of the cabin pressure rate. To illustrate, when the cabin pressure rate is low (e.g., the cabin pressure level 148 is changing slowly), the cabin pressure control system 154 has more time to bring the cabin pressure level 148 under control (e.g., by changing an airflow rate from the environmental control system 134, by changing a valve position of the cabin pressure outflow valve 126, or both). In this circumstance, a higher warning threshold 150 can be used to allow the cabin pressure control system 154 sufficient response time to correct the cabin pressure level 148. In contrast, a high cabin pressure rate may be indicative of circumstance that cannot be addressed automatically by the cabin pressure control system 154, accordingly a lower warning threshold 150 may be set so that the crew of the aircraft 100 are notified earlier. Similar rationale may be applied to set a lower oxygen deployment threshold 152 if the cabin pressure rate is high, a higher oxygen deployment threshold 152 if the cabin pressure rate is low, or both.

As another specific example, in some implementations, the cabin pressure control system 154 or the LRU 106 is configure to determine a cabin leakage parameter associated with the cabin 104. The cabin leakage parameter indicates a rate of leakage of air from the cabin 104 when the cabin pressure outflow valve 126 is fully closed. For example, as the aircraft 100 ages or is modified (e.g., due to maintenance or upgrades), it is normal for the cabin 104 to leak some air. The leakage rate of the cabin 104 changes over time. The cabin leakage parameter is indicative of the rate of leakage from the cabin 104 at a particular time. The cabin leakage parameter can be determined by measuring the cabin pressure rate while the position sensor 128 indicates that the cabin pressure outflow vale 126 is fully closed. When the cabin leakage parameter is high (e.g., the cabin 104 is leakier than normal), the cabin pressure control system 154 may take longer to achieve a particular change in the cabin pressure level 148. In this circumstance, a higher warning threshold 150 can be used to allow the cabin pressure control system 154 sufficient response time to correct the cabin pressure level 148.

As another specific example, in some implementations, the LRU 106 uses data indicating a phase of flight of the aircraft 100 to determine the pressure thresholds 108. The data indicating the phase of flight may be determined by the flight management system 156. In such implementations, different functions, different parameters, or different look-up tables are used to determine the pressure thresholds 108 depending on the phase of flight. To illustrate, the dynamically determined pressure thresholds 108 provide most benefit when flying into a high-altitude destination airport. Accordingly, the LRU 106 may use default values of the pressure thresholds 108 until the aircraft 100 enters a decent phase of flight, or until the aircraft 100 has been in a cruise phase of flight for a particular duration.

Figure 3:
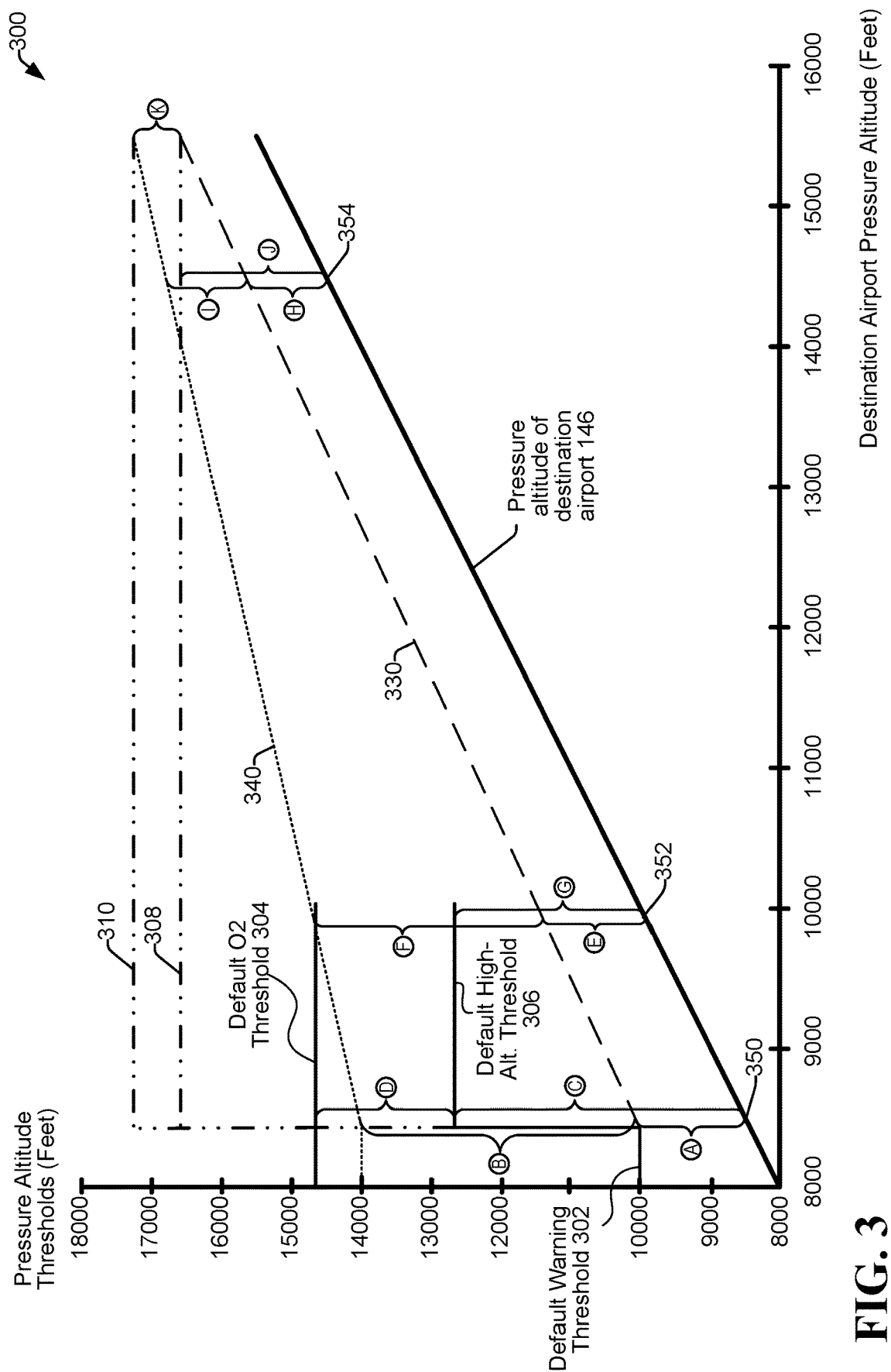
FIG. 3 is a first graph illustrating various pressure altitude thresholds.
Figure 4:
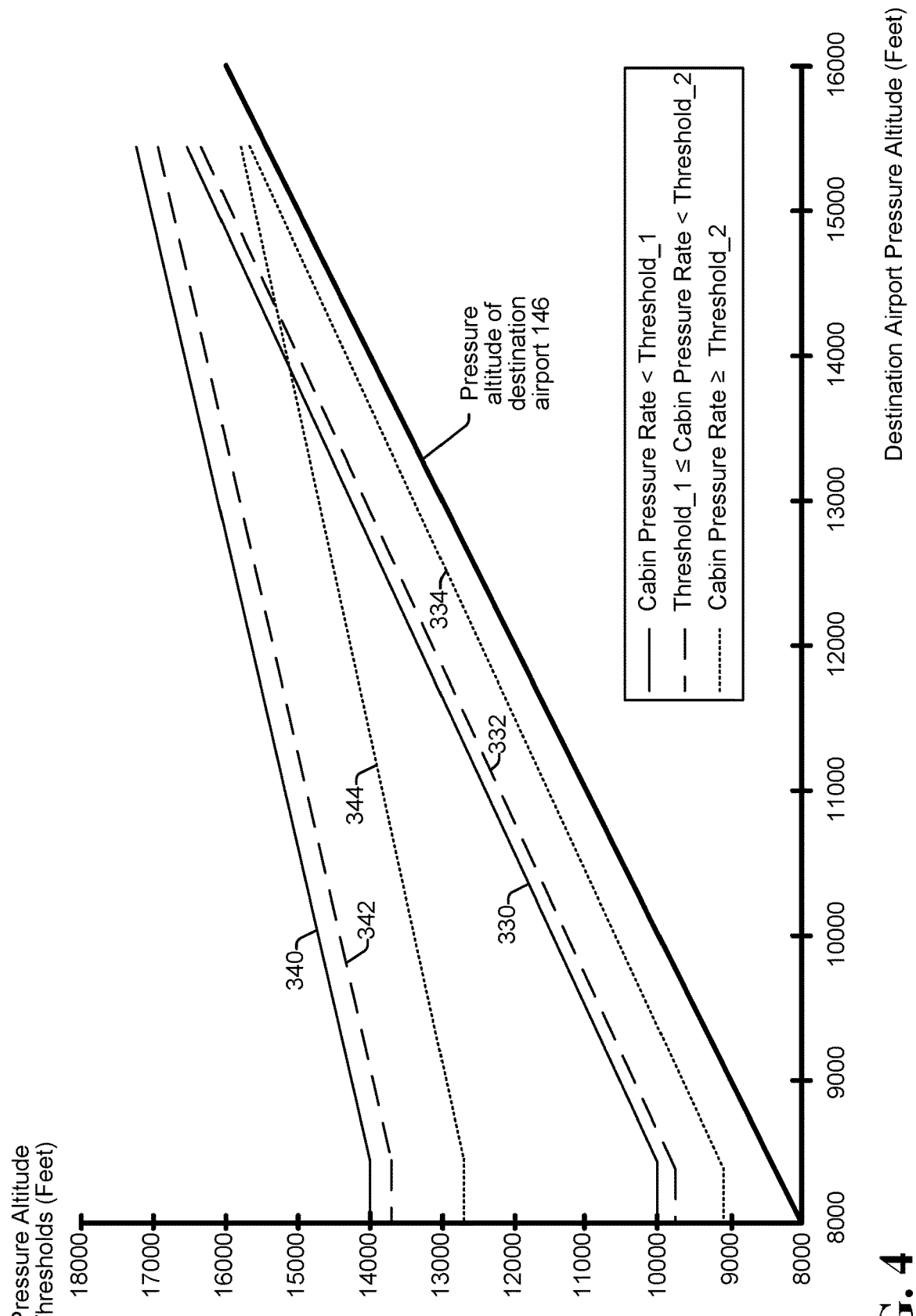
FIG. 4 is a second graph illustrating various pressure altitude thresholds.

Particular benefits of dynamically determining the pressure thresholds 108 based on the pressure altitude of the destination airport may be understood by reference to FIGS. 3 and 4. FIG. 3 is a graph illustrating default and dynamically determined pressure thresholds, and FIG. 4 is a graph illustrating different dynamically determined pressure thresholds.

The first graph illustrated in FIG. 3 illustrates a set of default pressure thresholds including a default warning threshold 302 of about 10,000 feet and a default oxygen deployment threshold ("default O₂ threshold") 304 of about 14,700 feet. The default pressure thresholds 302, 304 may be used when the aircraft 100 is operating in a default mode (e.g., a non-high-altitude destination mode). For example, the default pressure thresholds 302, 304 may be used by an aircraft flying into a destination airport with a pressure altitude of less than about 8,500 feet.

When an aircraft is flying into a high elevation airport (e.g., an airport with a pressure altitude of greater than or equal to about 8,500 feet), the aircraft may operate in a high-altitude destination mode, as explained above. FIG. 3 illustrates three different types of high-altitude destination mode pressure thresholds including two examples in which different default pressure thresholds are used in the high-altitude destination mode, and one example in which dynamic pressure thresholds are used in the high-altitude destination mode.

Pressure thresholds associated with the first example are illustrated in FIG. 3 using solid lines. In the first example, when the aircraft operates in the high-altitude destination mode, a value of the default oxygen deployment threshold 304 remains unchanged (about 14,700 feet in the example illustrated in FIG. 3). However, the value of the warning threshold is changed to the default high-altitude warning threshold 306 (about 12,700 feet in the example illustrated in FIG. 3).

Pressure thresholds associated with the second example are illustrated in FIG. 3 using lines with dashes separated by two dots. In the second example, when the aircraft operates in the high-altitude destination mode, the value of the oxygen deployment threshold is increased to a high-altitude oxygen deployment threshold 310 (typically near a maximum safe value, e.g., about 17,300 feet in the example illustrated in FIG. 3), and the value of the warning threshold is changed to a high-altitude warning threshold 308 (about 16,600 feet in the example illustrated in FIG. 3).

Pressure thresholds associated with the third example are illustrated in FIG. 3 using a dotted line for the high-altitude oxygen deployment threshold 340 and a dashed line for the high-altitude warning threshold 330. In the third example, when the aircraft operates in the high-altitude destination mode, the value of the high-altitude oxygen deployment threshold 340 and the value of the high-altitude warning threshold 330 are determined as a function of the pressure altitude of the destination airport 146. To contrast with the various default pressure thresholds of the first and second examples, the pressure threshold 330, 340 are referred to herein as "dynamically determined" pressure thresholds; however, the term "dynamically determined" is not intended to indicate a time dependence of the pressure thresholds, but rather indicates that the pressure thresholds are determined based on current conditions, such as the pressure altitude of the destination airport 146. To illustrate, in the example illustrated in FIG. 3, when the pressure altitude of the destination airport 146 is about 10,000 feet, the high altitude warning threshold 330 has a value of about 11,400 feet, and the high-altitude oxygen deployment threshold 340 has a value of about 14,700 feet. Further, when the pressure altitude of the destination airport 146 is about 12,000 feet, the high altitude warning threshold 330 has a value of about 13,200 feet, and the high-altitude oxygen deployment threshold 340 has a value of about 15,700 feet. In the example illustrated in FIG. 3, the values of the high-altitude oxygen deployment threshold 340 and the high-altitude warning threshold 330 are linear functions of the pressure altitude of the destination airport 146. In some implementations, the values of the high-altitude oxygen deployment threshold 340 and the high-altitude warning threshold 330 are related to the pressure altitude of the destination airport 146 by a non-linear function or a piecewise linear function.

By dynamically determining the values of the high-altitude oxygen deployment threshold 340, the high-altitude warning threshold 330, or both, rather than merely using different default values (e.g., the default high-altitude warning threshold 306, the default high-altitude warning threshold 308, and the default high-altitude oxygen deployment threshold 310), several benefits are achieved. Particular benefits are illustrated by differences between the values of pairs of pressure threshold (i.e., a warning threshold and a corresponding oxygen deployment value) used at various pressure altitudes of the destination airport 146 in the first, second and third examples described above. For ease of reference, the differences discussed below are indicated in FIG. 3 by brackets labeled with letters. Differences are indicated for three different values 350, 352 and 354 of the pressure altitude of the destination airport 146. A first value 350 of the pressure altitude of the destination airport 146 is about 8600 feet (e.g., near a lowest value at which a high-altitude destination mode is used), a second value 352 of the pressure altitude of the destination airport 146 is about 9900 feet (e.g., near an maximum value at which the default high-altitude warning threshold 306 and the default oxygen deployment threshold 304 are used), and a third value 354 of the pressure altitude of the destination airport 146 is about 14,500 feet. Table 1 shows approximate values of the differences in the example illustrated in FIG. 3.

TABLE 1

| Difference Ref. Letter | Press. Alt. of Dest. Airport (ft) | Warning Threshold Value (ft) | O2 Deploy Threshold Value (ft) | Difference Value (ft) |
|---|---|---|---|---|
| A | 8,600 | 10,100 | n/a | 1,500 |
| B | 8,600 | 10,100 | 14,100 | 4,000 |
| C | 8,600 | 12,700 | n/a | 4,100 |
| D | >8,500 | 12,700 | 14,700 | 2,000 |
| E | 9,900 | 11,300 | n/a | 1,400 |
| F | 9,900 | 11,300 | 14,700 | 3,400 |
| G | 9,900 | 12,700 | n/a | 2,800 |
| H | 14,500 | 15,700 | n/a | 1,200 |
| I | 14,500 | 15,700 | 16,800 | 1,100 |
| J | 14,500 | 16,600 | n/a | 2,100 |
| K | >8,500 | 16,600 | 17,300 | 700 |

As previously explained, while operating in the non-high-altitude destination mode, the value of the default warning threshold 302 (about 10,000 feet) and the value of the default oxygen deployment threshold 304 (about 14,700 feet) are used. Thus, for a destination airport pressure altitude of about 8,000 feet, there is about 2,000 feet between the default warning threshold 302 and the pressure altitude of the destination airport 146, and there is about 4,700 feet between the default warning threshold 302 and the default oxygen deployment threshold 304.

As indicated by differences C and D, in the first example described above and illustrated with solid lines, the relationship between the warning threshold, the oxygen deployment threshold, and the pressure altitude of the destination airport 146 changes dramatically when the high-altitude destination mode is used. In this example, when the high-altitude destination mode is engaged (e.g., at the first value 350 of the pressure altitude of the destination airport 146), the distance between the oxygen deployment threshold and the warning threshold changes is reduced to only 2,000 feet (i.e., difference D), and the distance between the pressure altitude of the destination airport 146 and the warning threshold increases to over 4000 feet (i.e., difference C). The aircraft crew will not be notified (e.g., warned) of a cabin pressure issue until the cabin pressure satisfies the warning threshold (about 12,700 feet) and, if the cabin pressure issue continues, the crew will only have until the cabin pressure satisfies the oxygen deployment threshold (about 14,700 feet) to correct the cabin pressure issue to avoid oxygen-mask deployment. That is, the crew has about 2000 feet to respond and correct or mitigate the cabin pressure issue. In contrast, in the non-high-altitude destination mode, the crew would have about 4,700 feet to respond to the cabin pressure issue to avoid oxygen-mask deployment. Thus, the first example significantly reduces (e.g., by more than half) the response time available to the crew relative to the response time available to the crew in the non-high-altitude destination mode.

Additionally, by shifting the warning threshold independent of the pressure altitude of the destination airport, the first example can significantly increase the delay between when a cabin pressure concern arises and when the crew is notified. For example, for a destination airport with a pressure altitude of about 8,000 feet and in the non-high-altitude destination mode, the crew will be notified when the cabin pressure is about 2,000 feet higher than the pressure altitude of the destination airport. In contrast, for a destination airport with a pressure altitude of about 8,600 feet and in the high-altitude destination mode according to the first example, the crew will not be notified until the cabin pressure is about 4,100 feet (difference C) higher than the pressure altitude of the destination airport.

Dynamically determining the pressure thresholds 330, 340 based on the pressure altitude of the destination airport 146 (as described above and illustrated in FIG. 3) maintains the relationship between the warning threshold, the oxygen deployment threshold, and the pressure altitude of the destination airport 146 in the high-altitude destination mode in a manner the more closely approximates that relationship in the non-high-altitude destination mode. For example, at the first value 350 of the pressure altitude of the destination airport 146, the difference A is about 1,500 feet and the difference B is about 4,000 feet. Thus, the crew is notified much earlier of any cabin pressure concern, as indicated by the contrast between the difference A and the difference C. Also, the crew has longer to response to the cabin pressure concern before deployment of oxygen masks, as indicated by the contrast between difference B and difference D.

Differences between the first example and dynamically determining the pressure thresholds decrease as the pressure altitude of the destination airport 146 increases; however, even near a maximum pressure altitude at which the first example is used, the dynamically determined pressure thresholds provide better performance. For example, at the second value 352 of the pressure altitude of the destination airport 146, the dynamic pressure thresholds 330, 340 result in the crew is notified earlier of cabin pressure concern, as indicated by the contrast between the difference E and the difference G, and give the crew longer to response to the cabin pressure concern before deployment of oxygen masks, as indicated by the contrast between difference F and difference D.

Additionally, the first example is not usable when the pressure altitude of the destination airport 146 is very high, such as at the third value 354 of the pressure altitude of the destination airport 146. To fly into airports with pressure altitude as high as the third value 354, some aircraft are equipped to operate in a very high-altitude destination mode using the second example (e.g., pressure thresholds 308, 310 illustrated in FIG. 3 using dashed and doubled dotted lines). At a maximum value of pressure altitude of the destination airport 146 illustrated in FIG. 3 (e.g., about 15,500 feet), the dynamically determined pressure thresholds 330, 340 have values equal to the values of the default high-altitude warning threshold 308 and the default high-altitude oxygen deployment threshold 310, respectively. However, for destination airports with pressure altitudes less than about 15,500 feet, the dynamically determined pressure thresholds 300, 340 provide advantages over the pressure thresholds 308, 310 similar to the advantages described above relative to the pressure thresholds 306, 304. For example, at the third value 354 of the pressure altitude of the destination airport 146, the crew is notified earlier of cabin pressure concern, as indicated by the contrast between the difference H and the difference J, and the crew has longer to response to the cabin pressure concern before deployment of oxygen masks, as indicated by the contrast between difference I and difference K.

The graph illustrated in FIG. 4 illustrates different pressure thresholds that are dynamically determined based on the pressure altitude of the destination airport 146 as well as additional information. In the particular example illustrated in FIG. 4, the additional information includes the cabin pressure rate; however, in other examples the additional information includes a state of an environmental control system, an airflow rate of the environmental control system, a state of a bleed air system, an airflow rate of the bleed air system, a phase of flight of the aircraft, a cabin leakage parameter, other information, or a combination thereof.

In the example illustrated in FIG. 4, when the cabin pressure rate is less than a first threshold ("Threshold_1"), one or both of the pressure thresholds 330 and 340 are determined based on the pressure altitude of the destination airport 146 according the function illustrate in FIG. 3. However, if the cabin pressure rate is greater than or equal to the first threshold and less than a second threshold ("Threshold_2"), a different function is used to determine pressure thresholds 332 and 342 based on the pressure altitude of the destination airport 146. In the example illustrated in FIG. 4, the line representing values of the warning threshold 332 is offset from and parallel to the line representing values of the warning threshold 330, and the line representing values of the oxygen deployment threshold 342 is offset from and parallel to the line representing values of the oxygen deployment threshold 340. Thus, in this example, when the cabin pressure rate is between the first threshold and the second threshold, values of the pressure thresholds 332, 342 are offset by a constant amount from values of the pressure thresholds 330, 340 for the same value of the pressure altitude of the destination airport 146.

In FIG. 4, if the cabin pressure rate is greater than or equal to the second threshold, the line representing values of the warning threshold 334 is offset from and has a different slope than the line representing values of the warning threshold 330, and the line representing values of the oxygen deployment threshold 344 is offset from and has a different slope than the line representing values of the oxygen deployment threshold 340. Thus, in this example, as the cabin pressure rate increases, the pressure thresholds decrease (e.g., are offset from the pressure thresholds 330, 340), and the pressure thresholds may decrease at different rates (e.g., have different slopes).

While the example illustrated in FIG. 4 shows discrete thresholds for the cabin pressure rate, in other implementations, the pressure thresholds vary continuously based on the cabin pressure rate. For example, a function (or functions) used to calculate or compute the pressure thresholds based on the pressure altitude of the destination airport 146 may include a parameter corresponding to the cabin pressure rate. Alternatively, a value of the cabin pressure rate may be used to select a look-up table used to determine the pressure thresholds based on the pressure altitude of the destination airport 146.

The example illustrated in FIG. 4 can also, or in the alternative, be used for other information, such as the state of an environmental control system, the airflow rate of the environmental control system, the state of the bleed air system, the airflow rate of the bleed air system, the phase of flight of the aircraft, the cabin leakage parameter, etc. To illustrate, rather than changing the offset, the slope, or both, of the lines representing values of the pressure thresholds based on the cabin pressure rate, the offset, the slope, or both, of the lines may be changed based on the cabin leakage parameter satisfying a threshold, based on whether a component of the environmental control system or of the bleed air system is operating normal, based on the phase of flight, etc.

Figure 5:
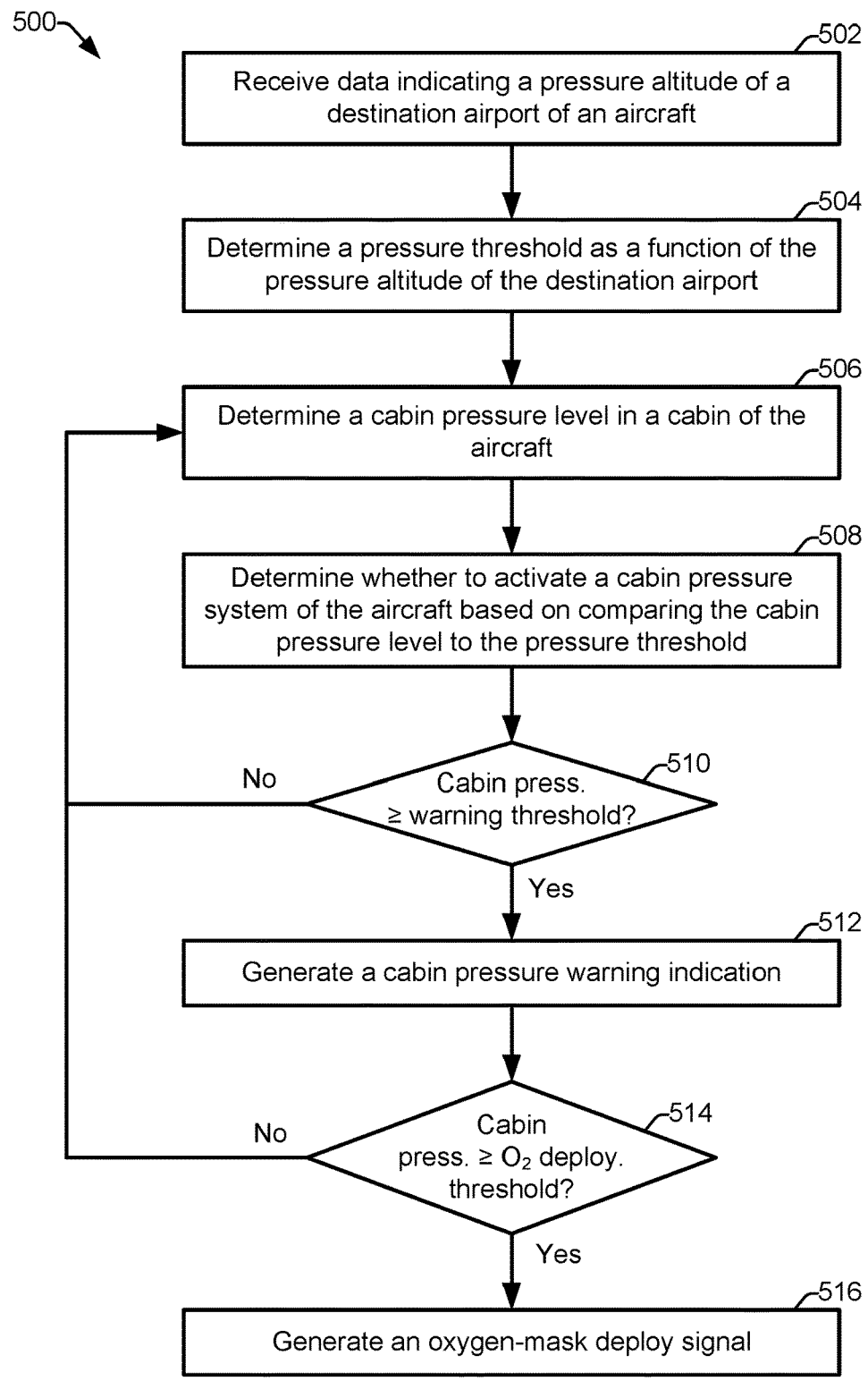
FIG. 5 is a flowchart illustrating a method of providing altitude warning and oxygen presentation.

FIG. 5 is a flowchart illustrating a method 500 of providing altitude warning and oxygen presentation. The method 500 may be performed by a component of the aircraft 100, such as by the LRU 106, while operating in, or to initiate operation in, a high-altitude destination mode.

The method 500 includes, at 502, receiving data indicating a pressure altitude of a destination airport of an aircraft. For example, the air data system 158 of FIG. 2 may automatically receive the data via a communications data link with a ground-based system, such as an air data system at the destination airport. In this example, the air data system 158 provides the pressure altitude of a destination airport 146 to the LRU 106. Alternatively, a pilot or crew member may input the data via the high-altitude destination input 120. The data indicating a pressure altitude of a destination airport may include a value of the pressure altitude of the destination airport, or may include information that can be used to determine the pressure altitude of the destination airport, such as a physical altitude of the destination airport and a pressure altitude difference value. In some implementations, data indicating the pressure altitude of the destination airport is received from multiple sources. To illustrate, the air data system 158 or a flight planning portion of the flight management system 156 may provide the physical altitude of the destination airport to the LRU 106, and a pilot may input the pressure altitude difference value via the high-altitude destination input 120. In this example, the LRU 106 determined the pressure altitude of the destination airport 146 based on the data received from the multiple sources.

The method 500 also includes, at 504, determining a pressure threshold as a function of the pressure altitude of the destination airport. The pressure threshold includes the warning threshold 150, the oxygen deployment threshold 152, or both. In a particular implementation, the LRU 106 retrieves the pressure threshold 108 from a look-up table based on the pressure altitude of a destination airport 146 (and potentially other information, such as a state of an environmental control system, an airflow rate of the environmental control system, a state of a bleed air system, an airflow rate of the bleed air system, a phase of flight of the aircraft, a cabin leakage parameter, other information, or a combination thereof). In another implementation, the LRU 106 calculates or computes the pressure threshold 108 based on a function that relates the pressure threshold 108 to the pressure altitude of a destination airport 146. The function may be a linear function, a piece-wise linear function, or a non-linear function, as described with reference to FIGS. 3 and 4. The function may also account for other information, such as a state of an environmental control system, an airflow rate of the environmental control system, a state of a bleed air system, an airflow rate of the bleed air system, a phase of flight of the aircraft, a cabin leakage parameter, other information, or a combination thereof.

The method 500 also includes, at 506, determining a cabin pressure in a cabin of the aircraft. As explained with reference to FIGS. 1 and 2, the cabin pressure is determined based on measurements or data from the cabin pressure sensors 110.

The method 500 also includes, at 508, determining whether to activate a flight safety system of the aircraft based on comparing the cabin pressure to the pressure threshold. As illustrated in FIG. 2, the flight safety system 162 can include a cabin pressure warning indication 112, an oxygen mask system 114, or both. The LRU 106 determines whether to activate the flight safety system 162 by comparing the cabin pressure to the pressure threshold 108. To illustrate, in the method 500 illustrated in FIG. 5, the pressure threshold includes the warning value and the oxygen deployment value. In this example, the method 500 includes, at 510, comparing the cabin pressure to the warning threshold. At 512, a cabin pressure warning indication is activated if the cabin pressure satisfies (e.g., is greater than or equal to) the warning threshold expressed in terms of pressure altitude. If the cabin pressure does not satisfy (e.g., is less than) the warning threshold, the method 500 returns to 506 to continue to monitoring the cabin pressure.

The method 500 illustrated in FIG. 5 also includes, at 514, comparing the cabin pressure to the oxygen deployment threshold. At 516, an oxygen-mask deploy signal is generated (e.g., the LRU 106 and sent to the oxygen mask system 114) if the cabin pressure satisfies (e.g., is greater than or equal to) the oxygen deployment threshold expressed in terms of pressure altitude. If the cabin pressure does not satisfy (e.g., is less than) the oxygen deployment threshold, the method 500 returns to 506 to continue to monitoring the cabin pressure.

Figure 6:
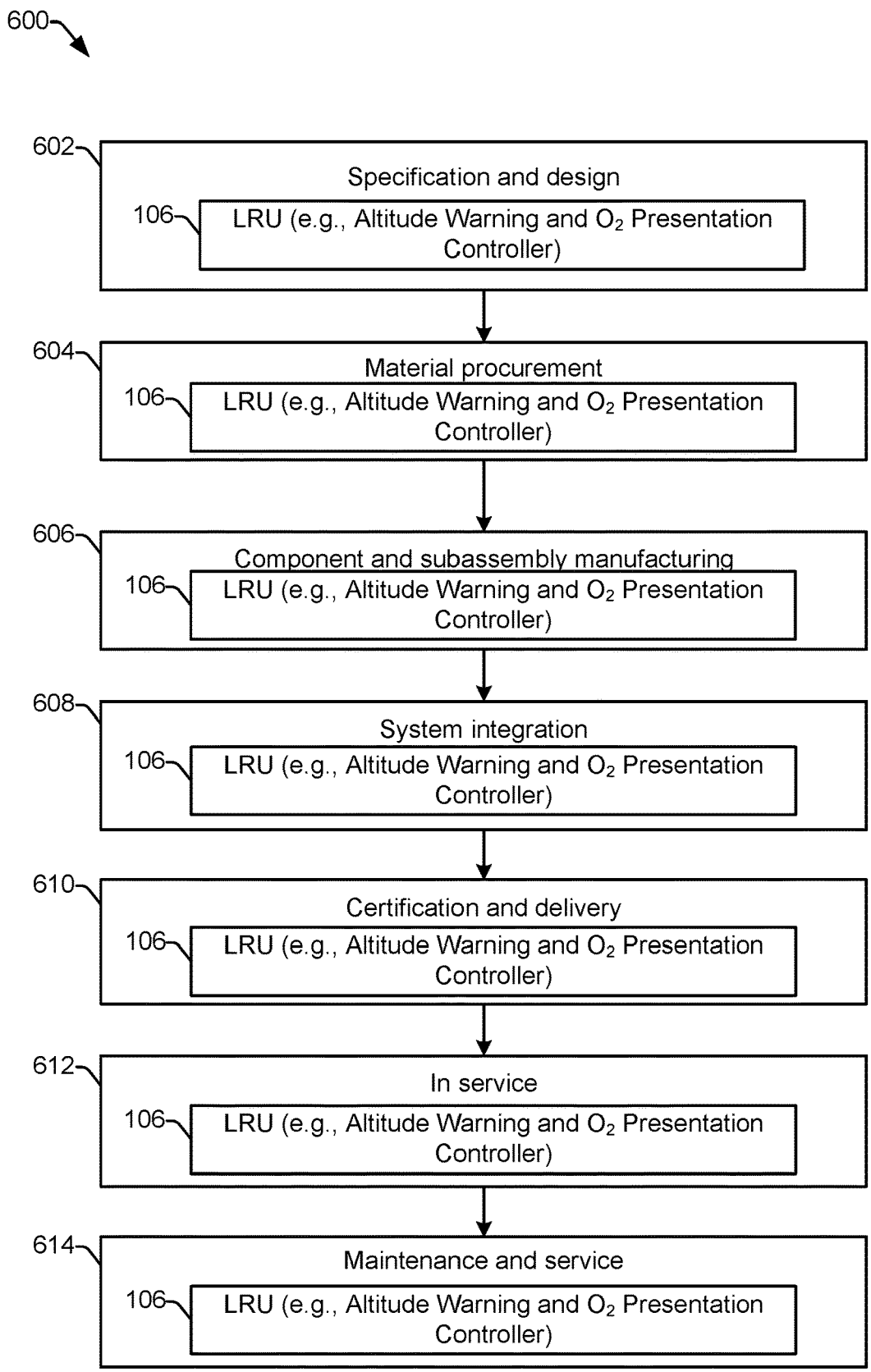
FIG. 6 is a flowchart illustrating a life cycle of an aircraft that includes the LRU of FIG. 1.

Referring to FIG. 6, a flowchart illustrative of a life cycle of an aircraft that includes a passively switched resonant chamber is shown and designated 600. During pre-production, the exemplary method 600 includes, at 602, specification and design of an aircraft, such as the aircraft 100 described with reference to FIG. 7. During specification and design of the aircraft, the method 600 may include specification and design of the LRU 106. At 604, the method 600 includes material procurement, which may include procuring materials for the LRU 106.

During production, the method 600 includes, at 606, component and subassembly manufacturing and, at 608, system integration of the aircraft. For example, the method 600 may include component and subassembly manufacturing of the LRU 106 and system integration of the LRU 106. At 610, the method 600 includes certification and delivery of the aircraft and, at 612, placing the aircraft in service. Certification and delivery may include certification of the LRU 106 to place the LRU 106 in service. While in service by a customer, the aircraft may be scheduled for routine maintenance and service (which may also include modification, reconfiguration, refurbishment, and so on). At 614, the method 600 includes performing maintenance and service on the aircraft, which may include performing maintenance and service on the LRU 106.

Each of the processes of the method 600 may be performed or carried out by a system integrator, a third party, and/or an operator (e.g., a customer). For the purposes of this description, a system integrator may include without limitation any number of aircraft manufacturers and major-system subcontractors; a third party may include without limitation any number of venders, subcontractors, and suppliers; and an operator may be an airline, leasing company, military entity, service organization, and so on.

Figure 7:
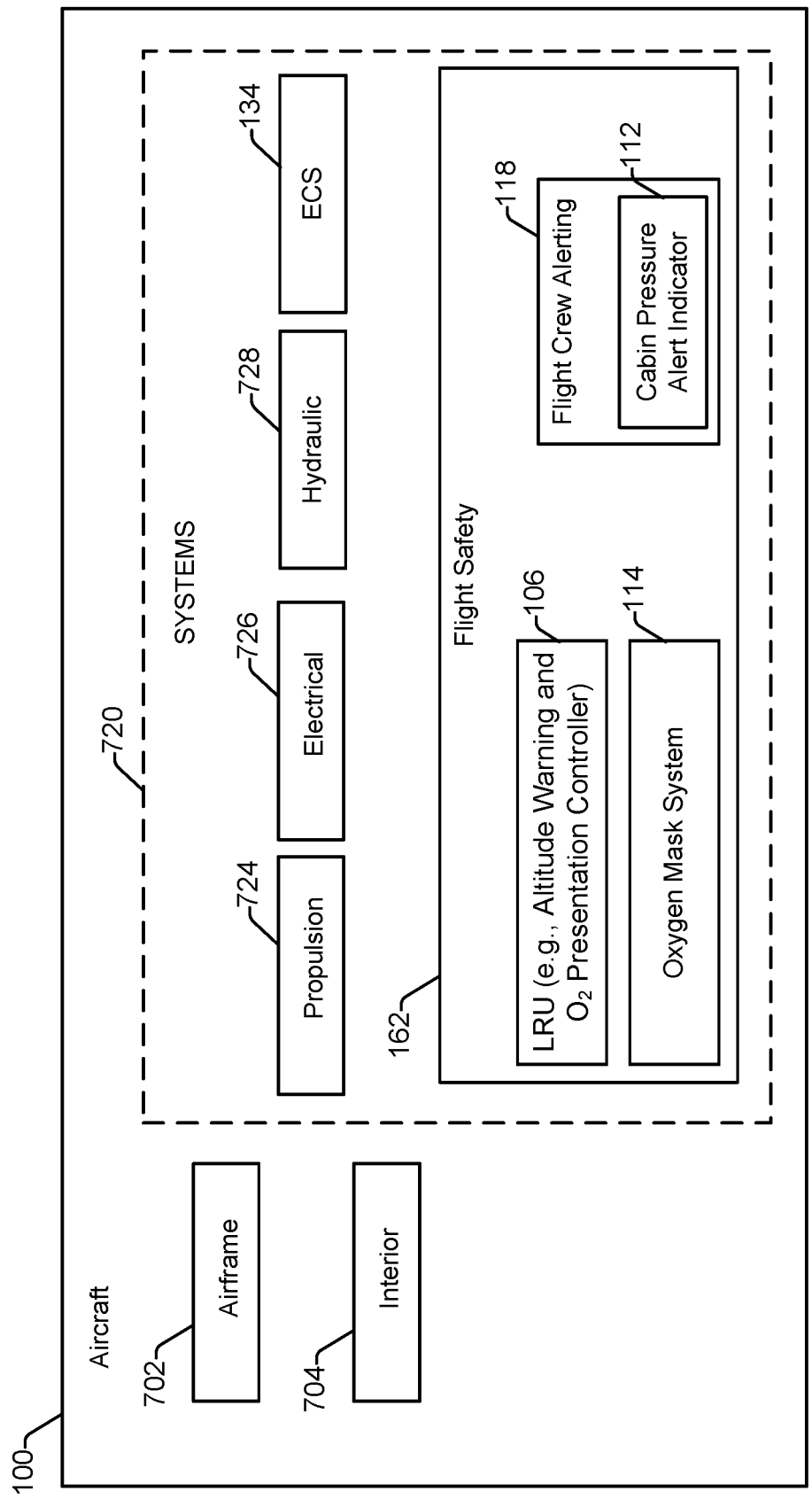
FIG. 7 is a block diagram of an aircraft that includes the LRU of FIG. 1.

Referring to FIG. 7, a block diagram of the aircraft 100 is shown. As shown in FIG. 7, the aircraft 100 produced by the method 600 may include an airframe 702 with a plurality of systems 720 and an interior 704. Examples of high-level systems 720 include one or more of a propulsion system 724, an electrical system 726, a hydraulic system 728, the environmental control system 134, and the flight safety system 162. The flight safety system 162 includes the LRU 106, the cabin pressure warning indication 112, and the oxygen mask system 114.

Apparatus and methods embodied herein may be employed during any one or more of the stages of the method 600. For example, components or subassemblies corresponding to a production process (e.g., the system integration process 608) may be fabricated or manufactured in a manner similar to components or subassemblies produced while the aircraft 100 is in service, at 612 for example and without limitation. Also, one or more apparatus embodiments, method embodiments, or a combination thereof may be utilized during production stages (e.g., elements 602-610 of the method 600), for example, by substantially expediting assembly of or reducing the cost of the aircraft 100. Similarly, one or more of apparatus embodiments, method embodiments, or a combination thereof may be utilized while the aircraft 100 is in service, at 612 for example and without limitation, to maintenance and service, at 614.

The illustrations of the examples described herein are intended to provide a general understanding of the structure of the various implementations. The illustrations are not intended to serve as a complete description of all of the elements and features of apparatus and systems that utilize the structures or methods described herein. Many other implementations may be apparent to those of skill in the art upon reviewing the disclosure. Other implementations may be utilized and derived from the disclosure, such that structural and logical substitutions and changes may be made without departing from the scope of the disclosure. For example, method operations may be performed in a different order than shown in the figures or one or more method operations may be omitted. Accordingly, the disclosure and the figures are to be regarded as illustrative rather than restrictive.

The steps of a method or algorithm (e.g., determining a value based on a function or based on a look-up table) described in connection with the implementations disclosed herein may be included directly in hardware, in a software module executed by a processor, or in a combination of the two. A software module may reside in random access memory (RAM), flash memory, read-only memory (ROM), programmable read-only memory (PROM), erasable programmable read-only memory (EPROM), electrically erasable programmable read-only memory (EEPROM), registers, hard disk, a removable disk, a compact disc read-only memory (CD-ROM), or any other form of non-transient storage medium known in the art. An exemplary storage medium is coupled to the processor such that the processor can read information from, and write information to, the storage medium. In the alternative, the storage medium may be integral to the processor. The processor and the storage medium may reside in an application-specific integrated circuit (ASIC). The ASIC may reside in a computing device or a user terminal. In the alternative, the processor and the storage medium may reside as discrete components in a computing device or user terminal. A storage device is not a signal.

Moreover, although specific examples have been illustrated and described herein, it should be appreciated that any subsequent arrangement designed to achieve the same or similar results may be substituted for the specific implementations shown. This disclosure is intended to cover any and all subsequent adaptations or variations of various implementations. Combinations of the above implementations, and other implementations not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single implementation for the purpose of streamlining the disclosure. Examples described above illustrate but do not limit the disclosure. It should also be understood that numerous modifications and variations are possible in accordance with the principles of the present disclosure. As the following claims reflect, the claimed subject matter may be directed to less than all of the features of any of the disclosed examples. Accordingly, the scope of the disclosure is defined by the following claims and their equivalents.

What is claimed is:

1. An aircraft comprising
   a fuselage including a cabin;
   a cabin pressure sensor configured to detect cabin pressure level in the cabin;
   a flight safety system; and
   a controller configured to:
      determine a pressure threshold as a function of a pressure altitude of a destination airport; and
      activate the flight safety system based on the cabin pressure level satisfying the pressure threshold, wherein the pressure threshold corresponds to an oxygen deploy threshold and activating the flight safety system includes sending an oxygen-mask deploy signal to an oxygen mask system to cause oxygen masks to be deployed within the cabin.

2. The aircraft of claim 1, wherein the controller is further configured to:
   determine a second pressure threshold, wherein the second pressure threshold corresponds to a warning threshold;
   activate a cabin pressure warning alert device based on the cabin pressure level satisfying the second pressure threshold.

3. The aircraft of claim 1, wherein the pressure threshold is determined based on the pressure altitude of the destination airport responsive to a signal indicating operation in a high-altitude destination mode.

4. The aircraft of claim 1, wherein the controller is further configured to receive data indicating a physical altitude of the destination airport and a pressure altitude difference value associated with the destination airport, and to determine the pressure altitude of the destination airport based on the data.

5. The aircraft of claim 1, wherein the controller is further configured to receive additional information and to determine the pressure threshold based on the pressure altitude of a destination airport and the additional information.

6. The aircraft of claim 5, wherein the additional information indicates cabin pressure rate, and wherein the controller is configured to determine a lower value of the pressure threshold responsive to a higher value of the cabin pressure rate and to determine a higher value of the pressure threshold responsive to a lower value of the cabin pressure rate.

7. The aircraft of claim 5, further comprising an environmental control system, wherein the additional information indicates airflow associated with the environmental control system, and wherein the controller is configured to determine the pressure threshold based on the airflow.

8. The aircraft of claim 5, further comprising an environmental control system, wherein the additional information indicates a state associated with a component of the environmental control system, and wherein the controller is configured to determine the pressure threshold based on the state of the component of the environmental control system.

9. The aircraft of claim 5, further comprising a bleed air system, wherein the additional information indicates airflow of a portion of the bleed air system, and wherein the controller is configured to determine the pressure threshold based on the airflow.

10. The aircraft of claim 5, further comprising a cabin pressure outflow valve, wherein the additional information indicates a position of the cabin pressure outflow valve, and wherein the controller is configured to determine a cabin leakage parameter based on the position of the cabin pressure outflow valve and to determine the pressure threshold based on the cabin leakage parameter.

11. The aircraft of claim 5, wherein the additional information is indicative of a phase of flight.

12. The aircraft of claim 1, further comprising a high-altitude destination input, wherein the pressure threshold is determined based on the high-altitude destination input indicating operation in a high-altitude destination mode, and wherein the controller is configured to activate the flight safety system based on the cabin pressure level satisfying a default pressure threshold based on the high-altitude destination input indicating operation in a non-high-altitude destination operation, wherein the default pressure threshold has a lower value than the pressure threshold.

13. A method comprising:
    determining a pressure threshold as a function of a pressure altitude of a destination airport of an aircraft and a cabin pressure rate, wherein the pressure threshold is determined to be a lower value of the pressure threshold responsive to a higher value of the cabin pressure rate, and wherein the pressure threshold is determined to be a higher value of the pressure threshold responsive to a lower value of the cabin pressure rate;
    determining a cabin pressure level of a cabin of the aircraft; and
    determining whether to activate a flight safety system of the aircraft based on comparing the cabin pressure level to the pressure threshold.

14. The method of claim 13, wherein the pressure threshold corresponds to a cabin pressure warning value and further comprising determining an oxygen-mask deployment value based on the pressure altitude of the destination airport, wherein the oxygen-mask deployment value is greater than the cabin pressure warning value, and wherein determining whether to activate the flight safety system is further based on comparing the oxygen-mask deployment value to the cabin pressure level.

15. The method of claim 14, further comprising activating a cabin pressure warning indication in response to the cabin pressure level satisfying the cabin pressure warning value.

16. The method of claim 14, further comprising generating an oxygen-mask deploy signal in response to the cabin pressure level satisfying the oxygen-mask deployment value.

17. A line replaceable unit comprising:

a processor; and a memory storing instructions executable by the processor to perform operations comprising:

determining a pressure threshold as a function of a pressure altitude of a destination airport of an aircraft, wherein the pressure threshold is determined based on the pressure altitude of the destination airport responsive to a signal indicating operation in a high-altitude destination mode; and determining whether to activate a flight safety system based on a comparison of a cabin pressure level and the pressure threshold, wherein the flight safety system comprises a cabin pressure warning alert device, an oxygen mask system, or a combination thereof.

18. The line replaceable unit of claim 17, wherein the operations further include receiving additional information, wherein the pressure threshold is based on the pressure altitude of the destination airport and the additional information.

19. The line replaceable unit of claim 17, wherein the pressure threshold is further determined based on a cabin pressure rate, wherein the pressure threshold is determined to be a lower value of the pressure threshold responsive to a higher value of the cabin pressure rate, and wherein the pressure threshold is determined to be a higher value of the pressure threshold responsive to a lower value of the cabin pressure rate.

20. The line replaceable unit of claim 17, wherein the operations further include, based on a signal indicating operation in a non-high-altitude destination mode, determining whether to activate the flight safety system based on a comparison of the cabin pressure level to a default pressure threshold, wherein the default pressure threshold has a lower value than the pressure threshold.

\* \* \* \* \*